United States Patent Office 2,803,302
Patented Aug. 20, 1957

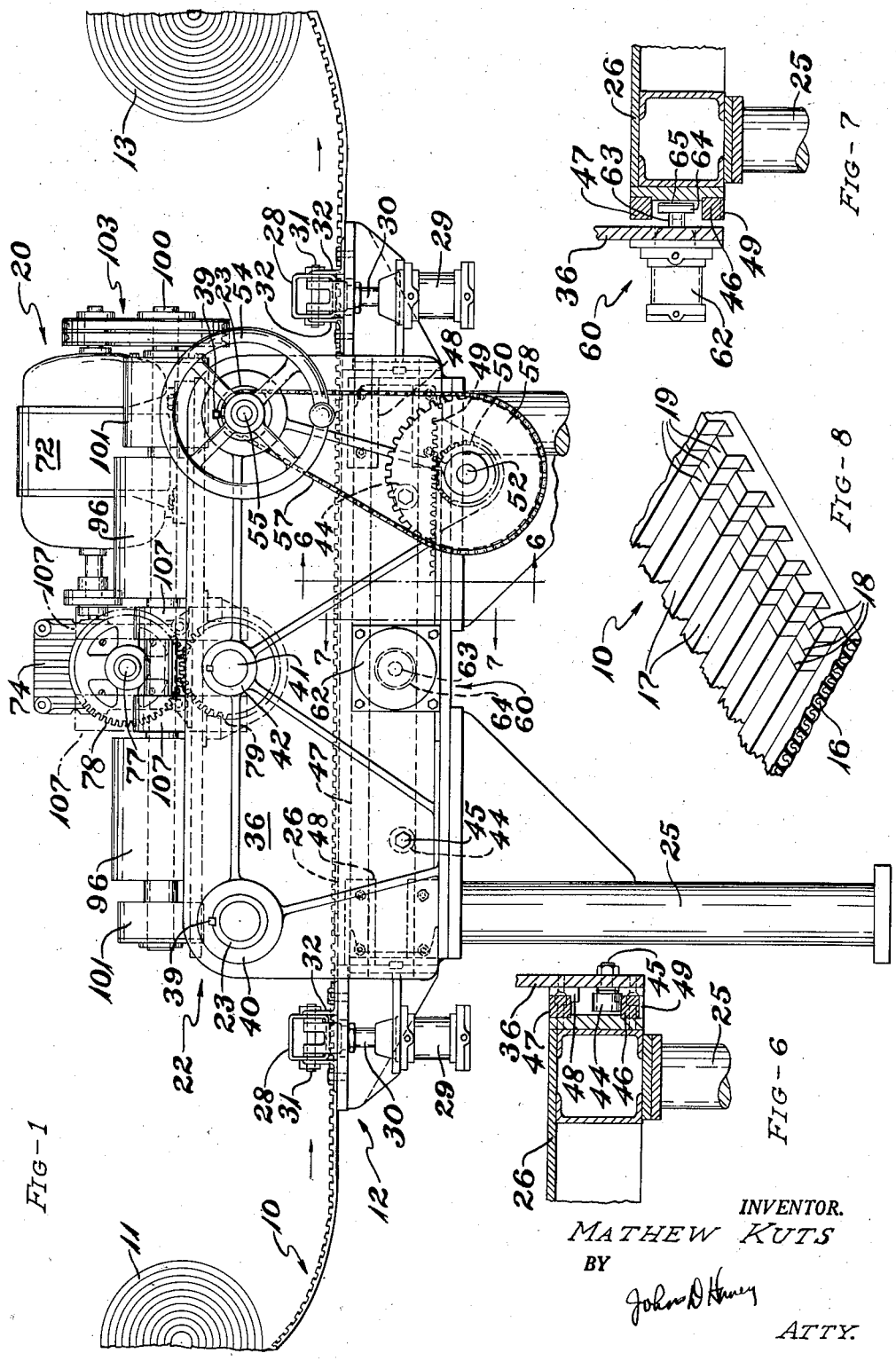

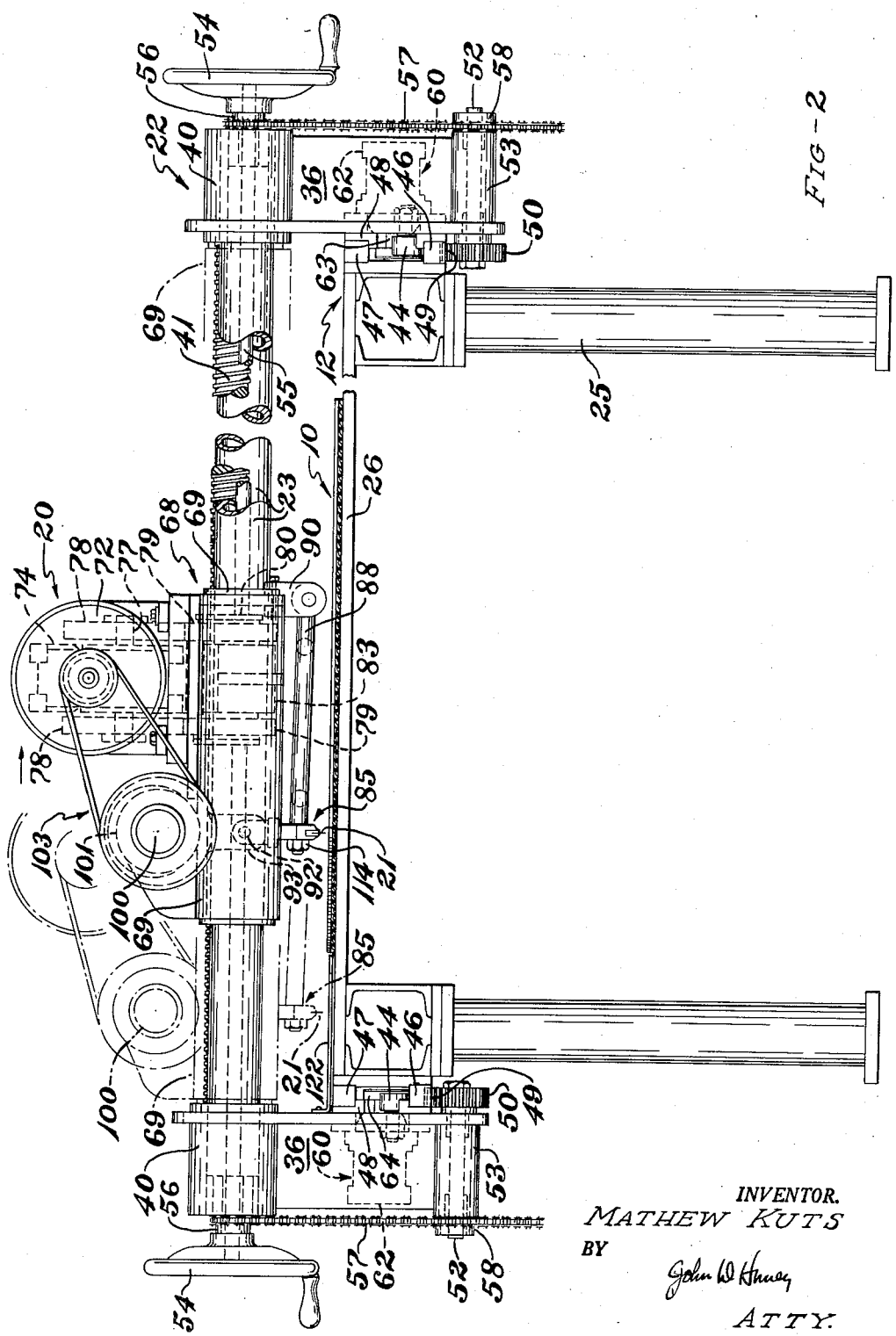

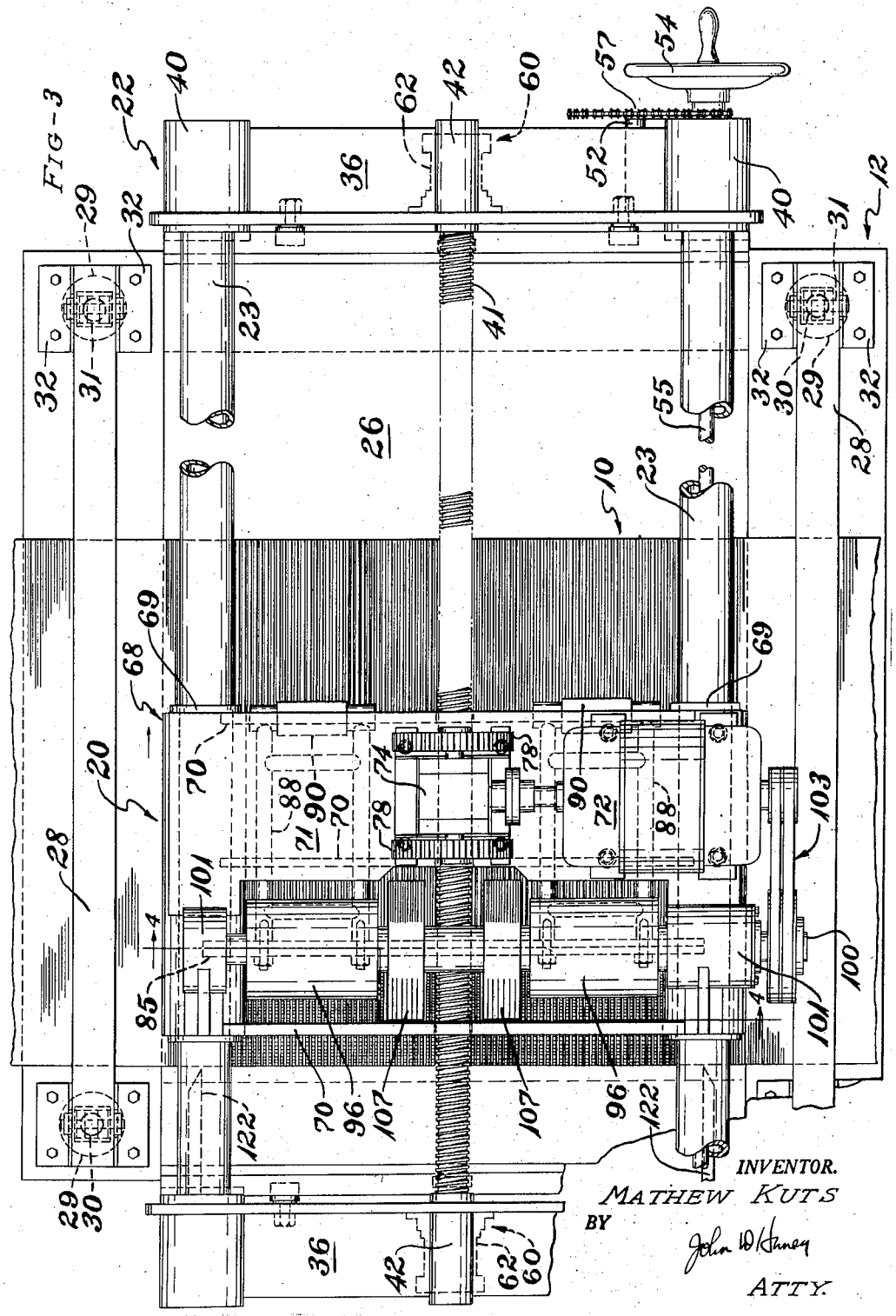

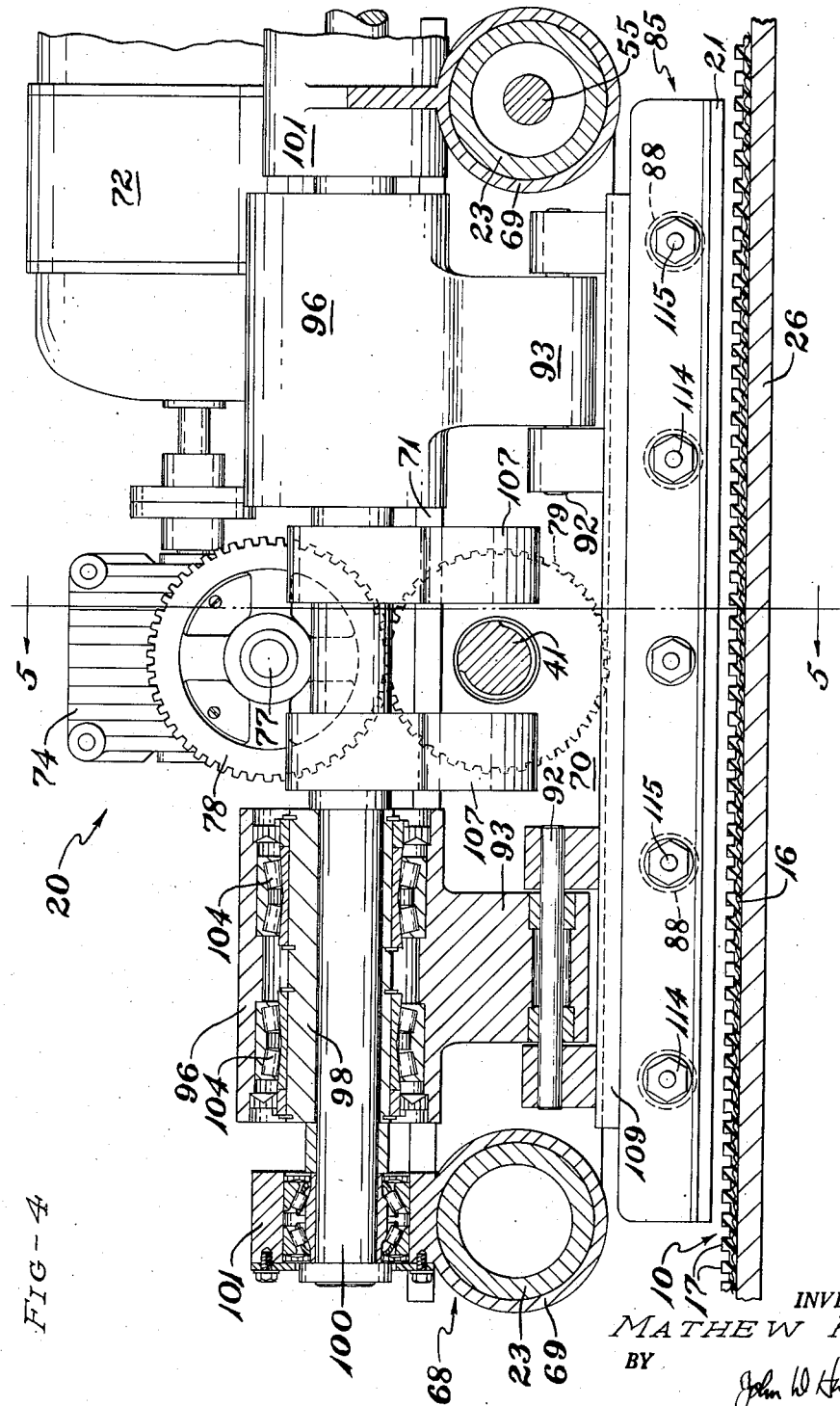

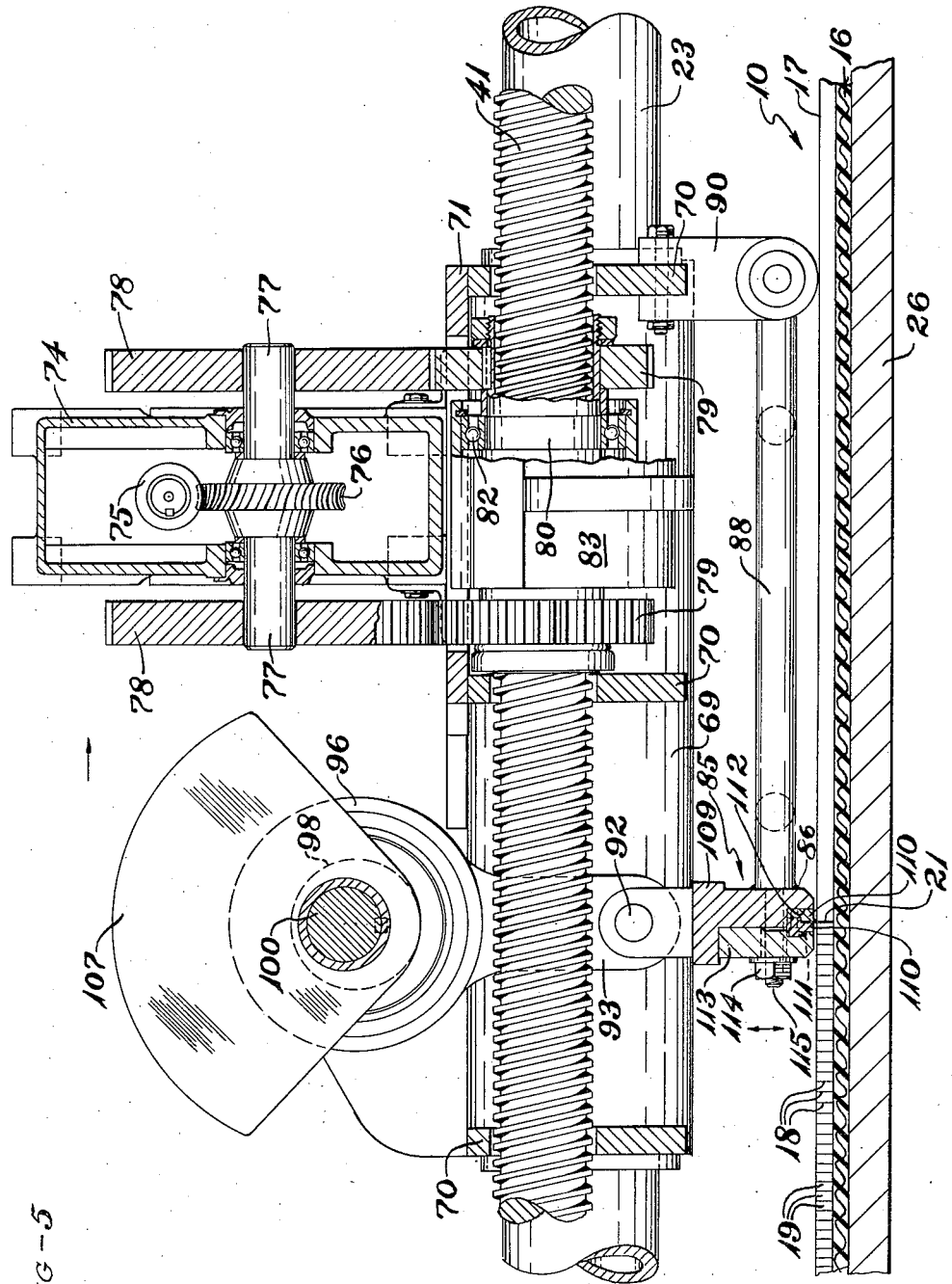

2,803,302

CUTTING CLOSELY SPACED INCISIONS IN RUBBER SHEET MATERIAL

Mathew Kuts, Akron, Ohio, assignor to The B. F. Goodrich Company, New York, N. Y., a corporation of New York Application October 19, 1954, Serial No. 463,147

18 Claims. (Cl. 164—17)

This invention relates to cutting closely-spaced parallel incisions in resilient articles such as vulcanized rubber sheet material to enhance the skid-resistance of the material. The invention includes a novel method of cutting the incisions and a cutting machine especially suitable for this purpose.

Rubber sheet material provided with closely-spaced incisions may be advantageously utilized for matting, stair treads, or as flexible belts for conveying slippery articles along inclined courses. One type of rubber sheet material proposed for such uses has a flat fabric-reinforced carcass and is vulcanized with a series of axially-continuous, parallel upstanding rubber ribs which are thereafter sliced crosswise to provide a traction surface for the material. The incisions of each rib are preferably closely spaced, for example they are preferably spaced apart from about 1/8 inch to 3/16 inch or more depending on the size of the rib. Prior to the present invention, it has been very difficult to form such incisions accurately and cleanly and at a speed acceptable for commercial production of this material.

In accordance with this invention the incisions may be made very rapidly and accurately without tearing or scuffing the ribs so that the finished material has a neat appearance and the traction surface of the material is of uniform skid-resistance throughout its area. This result is accomplished according to this invention by reciprocating a knife into and out of a group of the ribs while the knife is moved steadily along the ribs in a direction transverse to the reciprocating path of the knife and transverse to the cutting edge of the knife. In the machine provided by this invention, the knife is supported in cutting relation to the material by mechanism which imparts this reciprocating motion and which concurrently moves the knife translationally to traverse the material. The spacing between adjacent incisions is therefore dependent both on the frequency of the reciprocation of the knife and on the rate of its lateral translational movement. Another feature of this machine is that the mechanism for reciprocating the knife includes a pivoted link which guides the knife in an arcuate path of reciprocation. The knife is reciprocated at a frequency in the order of about 900 to 1000 cycles per minute and at such speeds, the use of the pivoted arm or link to guide the knife materially reduces frictional drag on the knife or misalignment which would be present if the knife were slidably supported by guideways or the like during its reciprocating movement. Preferably the power necessary to reciprocate the knife and to move it translationally is supplied from a single motor so that these movements of the knife are accurately synchronized with each other to provide uniform spacing of the incisions.

The invention will be further described with reference to the accompanying drawings which illustrate a machine which has been constructed in accordance with and embodying the principles of this invention.

In the drawings:

Fig. 1 is a side elevation of the machine;

Fig. 2 is an elevational view taken from the right end of the machine as it is shown in Fig. 1;

Fig. 3 is a plan view of the machine;

Fig. 4 is a detail sectional view along the line 4—4 of Fig. 3 showing the cutter mechanism drawn to an enlarged scale and when the knife is at the top of a reciprocating stroke.

Fig. 5 is a sectional view taken along the line 5—5 of Fig. 4 and showing the mechanism when the knife is at the bottom of its reciprocating stroke and is extended its maximum amount into the sheet material;

Fig. 6 is a detail view taken along the line 6—6 of Fig. 1;

Fig. 7 is a detail view taken on the line 7—7 of Fig. 1 and showing the mechanism for locking the cutter carriage relative to the table; and Fig. 8 is a perspective view of a portion of a strip of sheet material having a ribbed surface with crosswise incisions cut with this machine.

The drawings illustrate the operation of this machine when used for cutting incisions in a long strip of flat flexible conveyor belting 10 which in Fig. 1 is unwound on a let-off reel 11 and trained across the surface of a table 12 of the machine to a wind-up roll 13. A fragment of the belting is shown in Fig. 8 to illustrate the nature of the incisions made by this machine. The belting 10 includes a carcass portion 16 of one or more plies of fabric-reinforced rubber to one side of which is vulcanized a multiplicity of narrow, parallel, axially-continuous rubber ribs 17 of rectangular cross-section which extend transversely across the carcass substantially perpendicular to the lengthwise dimension of the belting. The belting is initially molded with the ribs 17 axially continuous as shown at the left portion of the fragment of Fig. 8 and in this machine the ribs are sliced crosswise with a series of incisions 18 which extend almost to the carcass. The incisions 18 are formed without removing any substantial amount of the rubber to divide each rib into a multiplicity of laterally-abutting, prism-shaped fingers 19. As the belting 10 is fed from the let-off reel 11 toward the table, the ribs will be continuous as are the ribs at the left portion of Fig. 8, and as it is delivered to the wind-up roll 13, each of the ribs will be incised throughout its length with a series of cuts 18. Sheet material of the type shown in Fig. 8 is the subject of a copending application of Henry L. Dixon, of the B. F. Goodrich Company, Serial No. 312,743, filed October 2, 1952, now Patent No. 2,784,835.

The principal elements of this machine include in addition to the table, a cutter mechanism 20 having a knife 21 (see Fig. 2) for cutting the desired incisions, and a carriage 22 mounted above the table for movement lengthwise relative to the table for supporting the cutter mechanism. The cutter mechanism 20 is slidably supported by the carriage on a pair of rods 23 (Fig. 3) and is movable along these rods to traverse the table laterally and form successive incisions in the ribs 17 of the belting. The machine is designed so that the cutter mechanism is moved continuously across the table during the cutting operation. At the start of a cutting cycle, the cutter mechanism may be positioned, for example, at the extreme left side of the table as shown in dotted lines in Fig. 2. During the cutting cycle the knife 21 is reciprocated against the belting and simultaneously the cutter mechanism moves continuously rightward along the rods 23 to the extreme right side of the table to complete the cycle. Then a length of uncut belting is positioned on the table from the reel 11 and this new length is incised in the next cutting cycle which consists of the movement of the cutter mechanism in reverse direction or leftward on the rods 23 until it arrives at its original position at the left side of the table. Between successive cycles the cutter mechanism 20 may be shifted by the carriage 22 to various positions lengthwise of the table, if necessary, to position the knife 21 of the cutter relative to the various areas of the belting in which the incisions are to be made.

The table structure includes a supporting base 25 having a flat rigid top 26 over which the belt is trained from the let-off reel 11. A portion of the belt is secured flat against the table top 26 and close to the left margin of the table top (see Fig. 3) during the operation of the cutter mechanism by a pair of clamping bars 28 which extend transversely across the table at the front and rear edges of the table and above the belting. The clamping bars are rigid tubular members which are movable vertically relative to the table top by pressure cylinders 29 at the ends of the bars. Each of the cylinders 29 is secured to the table base structure and has a piston rod 30 projecting upwardly through the table top 26 to a rod 31 which extends laterally through the ends of the clamping bars. Additionally, at each corner of the table there is a set of angle brackets 32 to guide the vertical movement of the clamping bars as they are raised and lowered by the cylinders 29. The length of belting fastened to the table intermediate the clamping bars 28 is the portion which is incised during each cutting cycle of the cutting mechanism. Between successive cutting cycles the clamping bars are released and the belting is fed forwardly toward the wind-up roll 13 until the next uncut portion of the belting is brought onto the table between the clamping bars and under the cutter mechanism.

The carriage 22 which supports the cutter mechanism includes a pair of upright side members 36 (see Fig. 2) which embrace opposite sides of the table and which are interconnected above the table by the pair of tubular rods 23 (see Fig. 3), the ends of each of which are secured by keys 39 in bosses 40 of the side members 36. Additionally the side members 36 are interconnected by a stationary screw 41 which extends above the table and the ends of which are rigidly secured in the bosses 42 of the side members. The rods 23 are of circular cross-sectional shape and of a uniform diameter throughout their length and, as previously noted, they are adapted to support the cutter mechanism 20 for slidable movement along them back and forth across the top of the table. The cutter mechanism is also engaged with the screw 41 and the screw is utilized in moving the cutter mechanism in reverse direction along the rods 23, as will be subsequently explained.

The carriage 20 is supported for movement lengthwise along the table by several rollers 44 (see Figs. 1 and 6) two of which are mounted on each of the side members 36 on stub shafts 45 projecting toward the sides of the table. The rollers 44 are supported on horizontal rails 46 which are secured along the sides of the table near each of the corners of the table. At each of the corners of the table a shorter guide bar 47 is fastened to the sides of the table above and parallel to the adjacent rails 46. Each guide bar 47 and its corresponding rail 46 cooperate to slidably receive between them a pair of horizontal bars 48 which project from the adjacent portion of the side members to prevent the carriage 20 from tilting relative to the table.

The lower or downwardly-directed side of each of the horizontal rails 46 at the forward end of the table has a toothed or rack-type gear surface 49 with which is meshed a pinion 50 (see also Fig. 2) mounted at one end of a stub shaft 52 journaled in a boss 53 on the adjoining side member 36. The pinions 50 may be rotated simultaneously and thus caused to "walk" along their respective racks 49 and thereby move the carriage 20 lengthwise of the table by either of the hand wheels 54 which are located on opposite sides of the carriage near the forward end of the table. The hand wheels 54 are each secured to opposite ends of a shaft 55 which extends through the forward tubular rod 23 at the front end of the carriage. At each end of the shaft 55 between the hand wheel and the end member 36 there is a small sprocket 56 engaged by a chain 57 to a larger sprocket 58 mounted on the pinion shaft 52 at the end opposite the pinion 50. The machine operator may utilize either one of the handwheels 54 to shift the carriage lengthwise along the table depending on whichever one is most convenient for him. By rotating either one of the handwheels, both pinions 50 will be driven along their respective racks to preclude the carriage from binding in the guides and becoming jammed.

The carriage may be locked rigidly to the table in any position in its range of movement relative to the table and by a lock mechanism 60 shown in Fig. 7 which is provided on each side of the table. The mechanism comprises a pressure cylinder 62, mounted horizontally on each side member 36 at about the center of the side member and having a piston rod 63 tipped at its outer extremity with a disc 64. The disc has a friction surface 65 directed toward the side of the table and the cylinder is operable to urge the disc against the side of the table. Prior to the operation of the cutter mechanism, the operator adjusts the position of the cutter relative to the work by moving the carriage along the table, and at the desired location, the cylinders 62 are energized to lock the carriage rigidly to the table. The carriage remains locked in this manner during the operation of the cutter mechanism.

The cutter mechanism includes a frame 68 formed of a pair of laterally-spaced relatively long sleeves 69 (see Fig. 3) which concentrically surround the rods 23 of the carriage and which are slidable on the rods. The sleeves are interconnected by several vertical tie bars 70 (Fig. 5) and by a cross-plate 71 which extends tangentially from one sleeve 69 to the other sleeve to serve as a pedestal to support a motor 72 which: (1) drives the cutter mechanism backwards and forwards along the rods 23 and relative to the table; and (2) reciprocates the knife 21 of the cutter mechanism. By performing both of these functions with a single motor, the translational movement of the cutter may be maintained accurately synchronized with the reciprocating motion of the knife.

To drive the cutter mechanism along rods 23, the motor 72 is coupled to a gear transmission unit 74 (see Fig. 4) mounted at the center of the cross-plate 71. The transmission 74 is a standard commercial unit in which the input torque is transmitted through a worm 75 and gear 76 (Fig. 5) to a pair of oppositely extending output shafts 77 on each of which is mounted a gear 78. The gears 78 are meshed with pinions 79 rigidly secured about the ends of an internally threaded collar 80 which is in threaded engagement with the stationary screw 41 of the carriage, the cross plate 71 being slotted in the areas immediately above the pinions 79 so that they intermesh with their respective gears 78. The threaded collar 80 is rotatably supported intermediate the pinions by a set of bearings 82 anchored in a housing 83 which is rigidly secured to the bottom of the plate 71. Thus the rotation of the motor 72 is transmitted through the gears 78 to rotate the threaded sleeve 80 to advance it along the stationary screw 41 thereby sliding the cutter mechanism along the rods 23. The motor is reversible so that the cutter mechanism is movable by this structure in either direction along the rods 23.

Simultaneously with the movement of the cutter mechanism from one side of the table to the other, the knife 21 of this mechanism is reciprocated rapidly toward and away from the belting to make the parallel spaced incisions in the belting. The knife is fastened in a rigid frame 85 (Figs. 4–5) which is welded as at 86 to the ends of a pair of links 88. The links 88 are disposed generally horizontally below the frame of the cutter mechanism and the opposite ends of which are pivotally fastened to lugs 90 on the lower portion of the cutter frame. To reciprocate the knife, the knife frame is pivotally connected by pins 92 to the lower ends of a pair of connecting rods 93. The upper end of each of the connecting rods 93 terminates in a cylindrical housing 96 (Fig. 4) which surrounds an eccentric sleeve 98 supported on a horizontal drive shaft 100. The ends of the shaft 100 are journaled in bearings 101 on the sleeves 69 and the shaft 100 is driven by a V-belt drive 103 (Fig. 3) from the motor 72. The eccentric sleeves 98 are journaled for rotation relative to their respective surrounding housings 96 of the connecting rods 93 by bearings 104.

As the drive shaft 100 is rotated, the eccentric sleeves 98 axially reciprocate the connecting rods 93 in a generally vertical direction. However, since the knife 21 is pivotally supported by the link 88, it is apparent that the knife is reciprocated by the connecting rods in an arcuate path of radius equal to the length of the pivoted links 88. The links 88 are relatively long and the reciprocating stroke of the knife is short; hence the reciprocating path of the knife 21 deviates only slightly from a straight-line vertical motion. The use of the pivoted links 88 advantageously eliminates the need for a guideway or the like to support the knife. A guide way or similar structure would occupy too much space in this machine, and would probably interfere with the operation of changing the knife blades, and further would wear appreciably due to the extremely rapid reciprocation of the knife.

The drive shaft 100 is dynamically balanced by counterweights 107 which are secured to the drive shaft 100 intermediate the eccentric sleeves 98. Fig. 5 shows the knife 21 at the bottom of its cutting stroke and in this position, the counter weights 107 are directed upwardly opposite the eccentricity of the sleeves 98. Fig. 4 shows the knife 21 at the upper limit of its stroke and in this position the counter weights are directed downwardly.

Details of the structure of the frame 85 in which the knife 21 is secured are shown in Fig. 5. The frame includes a member 109 having a cross-sectional shape like an inverted L, the downwardly directed leg of which is welded to the ends of the links 88. The knife 21 is a thin long strip of flexible steel and is clamped between two holding bars 110 by set screws 111. These holding bars when assembled with the knife 21 fit into a rabbet 112 along the bottom of the member 109 and are clamped in the rabbet by an outer plate 113. The plate 113 is secured against the holding bars by a series of nuts 114 threaded onto studs 115 which are seated in the member 109 and which extend through the plate 113. The knife blade 21 may be conveniently removed and replaced by another similar knife by loosening the several nuts 114.

As previously noted, the cutter mechanism 20 is moved translationally along the rods 23 at a uniform speed during the reciprocation of the knife. It is therefore apparent that in the interval between the instant the knife first strikes the belt on its downward cutting stroke and the instant that the knife is separated from the belt on its upward stroke, the knife will have been moved laterally a certain distance in a direction transverse to the cutting edge of the knife. It might be expected that this mode of operation would produce either ragged cuts, irregular slanted cuts and/or break the knife blade. It has been found, however, that none of these effects occur, but in fact the cuts are vertical, uniformly spaced, and are formed cleanly. As an example of the operation of this machine, the drive shaft 100 of this machine has been operated at a speed in the order of about 900 R. P. M. and simultaneously the cutter mechanism has been advanced translationally across the belting at a speed of about seven feet per minute so a strip of belting approximately 48 inches wide may be traversed by the knife in about 35 seconds. At these speeds, the incisions formed were spaced apart about 3/32" and each cut was about 3/16" deep. The knife 21 is preferably about 36" in length. Preferably the eccentricity of the sleeves 98 is about twice the depth of the cut desired to be made so that the cutting edge of the knife 21 is in actual contact with the belting during about 120° of each revolution of the drive shaft.

To aid the operator in positioning the knife relative to the portion of the belting to be cut during each cutting cycle, the carriage 22 is provided with a pair of pointers 122 which as shown in Fig. 3 are secured to the left side member 36 and are spaced slightly above the table top so that they may slide freely over the top with the movement of the carriage. The pointers are triangular-shaped members with the apex of each terminating closely adjacent the edge of the belting material. The distance between the apices is equal to the length of the knife. In the operation of the machine the operator first clamps a length of belting to the table and then adjusts the position of the carriage by turning the hand wheel 54 until the pointer near the front end of the table is aligned with a rib of the belting. The operator then locks the carriage rigidly to the table by the lock mechanism 60, and then the operator places a crayon mark on the edge of the belting opposite the rearward pointer. Then he closes appropriate switches (not shown) to start the cutter mechanism 20 which then traverses the belting and forms the desired incisions until it reaches the opposite side of the carriage where it stops. Thereafter the operator trains the belting strip forwardly until the crayon mark he previously made is adjacent the forward pointer, and then he clamps the newly positioned portion of the belting to the table. Usually this is a relatively coarse adjustment and the operator will usually find it necessary to readjust the position of the carriage 22 until the forward pointer is accurately aligned with the mark on the edge of the belt. After readjustment, another crayon mark is made on the edge of the belting opposite the rearward pointer and then the cutter mechanism 20 is energized and travels back to its original position while cutting incisions in the newly positioned length. These operations are continued successively until all of the belting on the let-off roll 11 has been cut in this manner. It is possible to hold the portion of the belt on the table stationary with only one clamping bar 28 so that there will be no waste of the belting at either end of the roll but it is preferred to clamp the belt with both clamping bars to ensure proper performance of the machine.

The appropriate limit switches, the necessary wiring for the motor 72 and the pneumatic circuits to operate the several cylinders will be evident from the foregoing description and are not illustrated in detail. Variations in the structure may be made within the scope of the appended claims.

I claim:

1. The method of cutting incisions in a resilient article such as rubber sheet material, which method comprises the steps of continuously moving a knife translationally relative to the article in a direction transverse to the cutting edge of the knife to traverse a first area of the article, thereafter positioning said knife in cutting relation with a second area of the article, and then continuously moving said knife translationally reversely to the direction of the aforesaid translational movement to traverse said second area, and during each of said translational movements reciprocating said knife continuously and transversely to the direction of said movements and into and out of the article.

2. A machine for cutting incisions in a resilient article such as rubber sheet material, the machine comprising a structure for supporting an article during the cutting operation, a knife having a cutting edge directed toward the article, a mechanism for reciprocating the knife into and out of the article, said mechanism including a link connected to the knife and pivotally connected to said mechanism at a location remote from the knife, the link guiding the knife in an arcuate path of reciprocation, means for supporting said mechanism for translational movement of said mechanism and said knife relative to the article in a direction transverse to the cutting edge of the knife, and means for continuously moving said mechanism and said knife relative to said supporting means synchronously with the reciprocation of the knife to traverse the article with the knife.

3. In a cutting machine for resilient articles of rubber-like material, a knife having a cutting edge directed toward said article; a mechanism for supporting said knife, the mechanism including a frame, a link disposed transversely to the knife and being connected to the knife and being pivotally engaged with the frame at a portion thereof remote from the knife, and means supported on the frame for reciprocating the knife into and out of said material with said link guiding the knife in an arcuate path of reciprocation; and means providing relative movement between said mechanism and said article in a direction transverse to the cutting edge of the knife during said reciprocating movement of the knife.

4. A machine for cutting incisions in a resilient article such as rubber sheet material, the machine comprising a knife having a cutting edge directed toward the article, a mechanism for reciprocating the knife, means for supporting said mechanism with the knife disposed in cutting relation to the article so that the knife is driven into and out of the article by said reciprocation, said mechanism being engaged with said supporting means for translational movement of the mechanism and the knife relative to said supporting means transverse to the cutting edge of the knife and the reciprocating movement of the knife, and means for steadily moving said mechanism and said knife translationally and concurrently with said reciprocating movement to traverse the article and form a series of parallel spaced incisions therein.

5. A machine for cutting incisions in a resilient article such as rubber sheet material, the machine comprising a knife of substantial length having a cutting edge along one lengthwise edge thereof; a mechanism for reciprocating the knife comprising a frame, a drive shaft journaled thereon, a power unit for rotating the drive shaft, and a linkage connecting the drive shaft to the knife to impart reciprocating motion to the knife from the rotational motion of the drive shaft; means supporting the frame of said mechanism for movement of the mechanism and the knife translationally transverse to the cutting edge of the knife and to the direction of said reciprocating motion of the knife; and means for continuously moving said mechanism and said knife translationally and synchronously with said reciprocating motion of the knife to traverse the article and form a series of parallel spaced incisions therein.

6. A machine in accordance with claim 5 in which said mechanism for reciprocating the knife further includes a link disposed transversely to the knife, the link being secured to said knife and pivotally connected to said frame at a point remote from said knife for guiding said knife in an arcuate path of reciprocation.

7. A machine for cutting incisions in a resilient article such as rubber sheet material, the machine comprising a knife having a cutting edge directed toward the article; mechanism for reciprocating the knife comprising a frame, a drive shaft, a power unit for rotating the drive shaft, and a linkage connecting the drive shaft to the knife to impart reciprocating motion to the knife in an arcuate path from the rotational motion of the drive shaft; means supporting said frame for movement of the mechanism and the knife translationally transverse to the direction of said reciprocating motion of the knife and to the cutting edge of the knife; a frame-propelling member disposed in the direction of said translational movement of the mechanism; means on the frame in positive driving engagement with said frame-propelling member; and means for advancing the latter said means along said frame-propelling member to move said mechanism and said knife translationally and concurrently with said reciprocating motion of the knife to traverse the article and form a series of parallel spaced incisions therein.

8. A machine for cutting incisions in a resilient article such as rubber sheet material, the machine comprising a rigid table structure for supporting the article; means for securing the article to the table; a knife having a cutting edge directed toward the article; mechanism for reciprocating the knife comprising a frame, a drive shaft journaled on the frame, and a linkage connecting the drive shaft to the knife to impart reciprocating motion to the knife in an arcuate path from the rotational motion of the drive shaft; means extending from one side of the table to the other side thereof for supporting said frame for movement of the mechanism and said knife translationally relative to the table in reverse directions transverse to the direction of said reciprocating motion of the knife and to the cutting edge of the knife; a stationary screw supported to extend in the direction of said translational movement of said mechanism; a collar in threaded engagement with said screw and rotatably secured to said frame; and a single power unit mounted on the frame and operatively connected (1) to said drive shaft for reciprocating the knife, and (2) to said collar to rotate the collar about the screw to impart said translational movement to said mechanism and knife in either of said reverse directions.

9. A machine in accordance with claim 7 which further includes means for adjustably securing said frame-supporting means at one of several positions relative to the article to position the knife in accurate cutting relation with said article.

10. A machine for cutting incisions in a resilient article such as rubber sheet material, the machine comprising a knife of substantial length having a cutting edge along one lengthwise edge thereof; mechanism for reciprocating the knife comprising a frame, a drive shaft journaled on the frame; and a linkage connecting the drive shaft to the knife to impart reciprocating motion to the knife in an arcuate path from the rotational motion of the drive shaft; means for supporting said frame with the knife in cutting relation to the article, said frame being movable relative to said means to move said mechanism and said knife translationally in reverse directions transverse to the cutting edge of the knife and to the direction of said reciprocating motion of the knife; a stationary screw supported to extend in the direction of said translational movement of said mechanism; a collar in threaded engagement with said screw and rotatably secured to the frame; and a single power unit supported on said frame and drivingly connected (1) to said drive shaft for reciprocating the knife, and (2) to said collar to rotate the collar about the screw to impart said translational movement to said mechanism and said knife in either of said reverse directions.

11. A method of cutting a series of closely-spaced parallel incisions transversely through upstanding resilient rubber ribs molded to flat sheet material to render such sheet material skid resistant, which method comprises positioning a thin knife of substantial length having a cutting edge along one lengthwise edge thereof transversely to a group of the ribs with said cutting edge directed toward the ribs, reciprocating the knife to urge said cutting edge into and out of the ribs, and synchronously with said reciprocation continuously moving the knife lengthwise of the ribs in a direction transverse to the cutting edge of the knife.

12. The method of claim 11 in which said knife is reciprocated in an arcuate path toward and away from said sheet material.

13. Apparatus for cutting a series of closely spaced parallel incisions transversely through upstanding resilient rubber ribs molded to flat sheet material, the apparatus comprising a table for supporting the sheet material with the ribs extending transversely to the table, a thin knife of substantial length having a cutting edge along one lengthwise edge thereof, means for supporting said knife with said edge transverse to a group of the ribs and directed toward the ribs, means for reciprocating the knife to urge said cutting edge into and out of the ribs, and means for continuously moving said reciprocating means and said knife lengthwise of the ribs in a direction transverse to said cutting edge of the knife synchronously with said reciprocating movement to advance said knife for cutting successive incisions through the ribs.

14. A machine for cutting parallel incisions in a resilient article such as rubber sheet material, the machine comprising an article-supporting structure, a thin knife of substantial length having a cutting edge along one lengthwise edge thereof directed toward said article, mechanism for supporting and reciprocating the knife to urge said cutting edge into and out of the article, and means for continuously moving said mechanism and said knife relative to the article in a direction transverse to said cutting edge of the knife synchronously with said reciprocating movement to advance said knife for cutting successive incisions in the article.

15. In a cutting machine, a table; guide members including a stationary screw extending transversely across the table; a cutter mechanism slidably supported by said guide members for movement along said guide members relative to the table, the cutter mechanism including a main frame supported by said guide members, a drive shaft journaled on said main frame, an eccentric sleeve secured about said shaft, a housing journaled about said sleeve, a knife frame pivotally connected to said housing, a link secured to said knife frame and extending laterally therefrom and being pivotally connected to said main frame at a position remote from said knife frame, a knife secured in said knife frame and having a cutting edge directed toward said table and positioned with its cutting edge transverse to the direction of movement of said main frame, a collar journaled on the main frame and in threaded engagement with said screw, and a single power unit engaged with both said collar and said drive shaft to move said main frame relative to said guide members and simultaneously to reciprocate said knife toward and away from the table.

16. In a cutting machine, a table; guide members extending transversely across the table including a stationary screw extending transversely across the table; and a cutter mechanism slidably supported by said guide members for movement along said guide members relative to the table, the cutter mechanism including a main frame supported by said guide members, a drive shaft journaled on said main frame, crank means on said drive shaft, a knife frame pivotally connected to said means, a collar journaled on the main frame in threaded engagement with said screw, a single power unit mounted on said main frame and rotatably engaged with both said collar and said drive shaft to synchronously move said main frame relative to said guide members and to reciprocate said knife frame toward and away from the table, and a knife of substantial length having a cutting edge along one lengthwise edge thereof positioned in said knife frame with said cutting edge transverse to the direction of movement of said main frame.

17. A cutting machine comprising a table; a carriage supported by the table for movement lengthwise of the table, the carriage having guide members including a stationary screw transverse to the table; and a cutter mechanism including a main frame supported by said guide members, a drive shaft journaled on said main frame, an eccentric sleeve secured about said shaft, a housing journaled about said sleeve, a knife frame pivotally connected to said housing, a link secured to said knife frame and extending laterally therefrom and being pivotally connected to said main frame at a position remote from said knife frame, a collar journaled on the main frame and in threaded engagement with said screw, a single power unit engaged with said collar and said drive shaft to synchronously move said main frame along said guide members and to reciprocate said knife frame toward and away from the table, and a knife of substantial length having a cutting edge along one lengthwise edge thereof positioned in said knife frame with said cutting edge transverse to the direction of movement of said main frame.

18. In a cutting machine, an article-supporting structure, a cutter mechanism, means for supporting the cutter mechanism for movement relative to the article-supporting structure, the cutter mechanism including a main frame engaged with said supporting means, a drive shaft journaled on the frame, a member journaled on said drive shaft eccentrically of the rotational axis of the drive shaft, a knife frame pivotally connected to said member, a link secured to said knife frame and extending laterally therefrom and being pivotally connected to the main frame at a position remote from said knife frame, a knife secured in the knife frame having a cutting edge directed toward said table and positioned with its cutting edge transverse to the direction of movement of said main frame, said supporting means including a frame-propelling member for said cutter mechanism, a driven member on said main frame in positive driving engagement with said frame-propelling member, and means to rotate said drive shaft and to drive said driven member simultaneously to move said main frame relative to said cutter-supporting means in a direction transverse to the cutting edge of the knife and to reciprocate the knife toward and away from said article-supporting structure.

References Cited in the file of this patent

UNITED STATES PATENTS

| 83,634 | Hopper et al. | Nov. 3, 1868 |
|---|---|---|
| 824,948 | Pollock | July 3, 1906 |
| 949,095 | Stephany | Feb. 15, 1910 |
| 997,686 | McGrath | July 11, 1911 |
| 1,076,772 | Lilleberg | Oct. 28, 1913 |
| 1,122,000 | Von Hassel | Dec. 22, 1914 |
| 1,585,012 | Biersdorf | May 18, 1926 |
| 1,829,679 | Schell | Oct. 27, 1931 |
| 1,848,696 | Christie | Mar. 8, 1932 |
| 2,039,161 | Friess | Apr. 28, 1936 |
| 2,480,721 | Egenolf et al. | Aug. 30, 1949 |
| 2,539,372 | Metzler | Jan. 23, 1951 |
| 2,562,892 | Cowan | Aug. 7, 1951 |
| 2,568,961 | Kipp | Sept. 25, 1951 |
| 2,642,372 | Chittick | June 16, 1953 |